United States Patent [19]

Long et al.

[11] Patent Number: 4,793,089
[45] Date of Patent: Dec. 27, 1988

[54] SURFACE TYPE FISHING LURE

[76] Inventors: Carl E. Long, 3063 Hyannis Dr., Cincinnati, Ohio 45239; William Hines, 2712 E. Towers Dr., Apt. 211, Cincinnati, Ohio 45238; Jack L. Gerros, 3760 Nightingale Dr., Cincinnati, Ohio 45227

[21] Appl. No.: 45,528

[22] Filed: May 4, 1987

[51] Int. Cl.$^4$ ............................................. A01K 85/00
[52] U.S. Cl. ................... 43/42.13; 43/42.14; 43/42.31
[58] Field of Search ............... 43/42.12, 42.13, 42.14, 43/42.16, 42.17, 42.18, 42.19, 42.31

[56] References Cited

U.S. PATENT DOCUMENTS

| | | | |
|---|---|---|---|
| 1,620,972 | 3/1927 | Hobbs | 43/42.14 |
| 2,516,434 | 7/1950 | Swan | 43/42.14 |
| 2,926,451 | 3/1960 | Leba | 43/42.14 |
| 3,112,576 | 12/1963 | Tay | 43/42.31 |
| 3,397,478 | 8/1968 | Lowes | 43/42.31 |
| 3,808,726 | 5/1974 | Flanagan | 43/42.13 |
| 4,510,710 | 4/1985 | Hanna | 43/42.13 |
| 4,619,068 | 10/1986 | Wotawa | 43/42.31 |
| 4,640,041 | 2/1987 | Stanley | 43/42.13 |

*Primary Examiner*—Kurt Rowan

*Attorney, Agent, or Firm*—Frost & Jacobs

[57] ABSTRACT

A surface type fishing lure having a pair of nested, noise-producing spinners. The lure is a frame-like structure of stiff bendable wire formed into integral first and second arms. A fish hook is rigidly affixed to the rearward end of the first arm constituting an extension thereof. A head element is located at the juncture of the first arm and the hook. A hook-concealing skirt may be affixed to the head element. The forward end of the first arm terminates in a loop to which a fishing line can be secured. The loop, in turn, terminates in the second arm having first and second portions. The first portion of the second arm extends from the loop in a lateral direction with respect to the first arm. The first portion of the second arm terminates in the second portion extending generally in the same direction as the first arm. The above noted pair of spinners is rotatively mounted in nested condition on the second portion of the second arm. The spinners are similarly configured, each having a body portion and two blades. The blade configurations and their angular relationships to their respective body portions cause them to rotate in the same direction at different speeds, striking each other to produce a fish attracting sound.

15 Claims, 2 Drawing Sheets

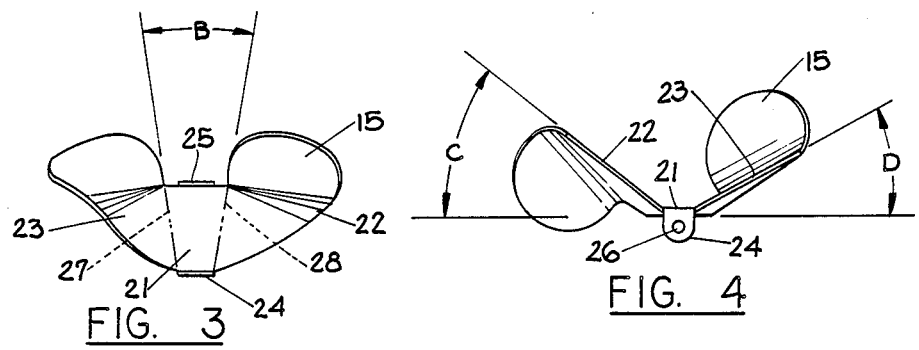
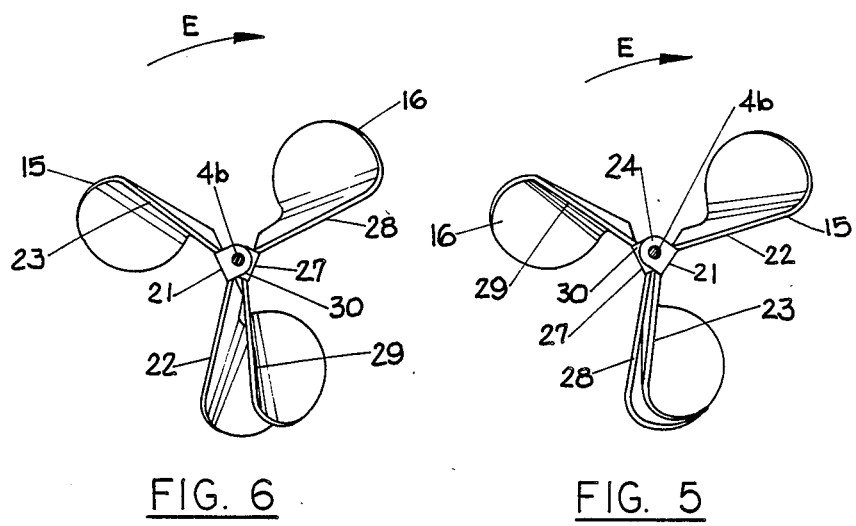

SURFACE TYPE FISHING LURE

TECHNICAL FIELD

The invention relates to a fishing lure, and more particularly to a surface type fishing lure provided with a pair of nested, noise-producing spinners.

BACKGROUND ART

Prior art workers have devised a great number of different types of fishing lures depending upon the type of fish to be caught, and the conditions under which the act of fishing is performed. While the teachings of the present invention are applicable to many types of lures wherein the action of spinners is desirable together with the production of fish attracting noise, for purposes of an exemplary showing they will be described in their application to surface-type lures utilized to catch large mouth bass and the like. More specifically, the teachings of the present invention will be described in their application to that type of fishing lure which has come to be known in the trade as a "buzz bait".

An example of such a lure is taught in U.S. Pat. No. 3,093,923. In this reference, the lure comprises a wire-like frame formed so as to provide an attachment loop for a fishing line, together with a pair of generally rearwardly extending arms. One arm is located above the other, with the lower arm being somewhat longer than the upper arm. The lower arm terminates in a spoon or wobbler plate. Affixed rigidly to the spoon and extending rearwardly thereof there is a fish hook terminating in an upstanded, barbed end. The hook may be substantially concealed by a cluster of feathers affixed to the hook shank. The upper arm rotatively mounts a single spinner.

Lures having more than one spinner mounted in tandem on a single shaft are well known, as is exemplified by U.S. Pat. Nos. 2,722,079; 3,766,682 and 4,447,980. U.S. Pat. No. 3,439,443 teaches the use of two spinners on a single shaft in a fishing lure. In this instance, one of the spinners is large and has a hollow central portion. The other spinner is small and is located on the same shaft within the hollow central portion of the large spinner. One of the spinners has permanently magnetized parts which attract the other spinner such that the spinning movement of the spinners is non-uniform and unsteady. The use of two spinners on a buzz bait-type lure, one spinner located on each of the wire-like arms, is taught in U.S. Pat. Nos. 3,750,325 and 4,201,008.

U.S. Pat. No. 3,112,576 teaches the provision of a lure having at least two tandemly mounted spinners on the same shaft, the spinners rotating in opposite directions. U.S. Pat. No. 3,987,478 teaches a fishing lure which emits a pulsed vibration when drawn through the water so as to attract the fish. The lure comprises a wire-like shaft terminating in a hook, or affixed to a hook. The shaft has a stabilizing member at its rearward end. Rotatively mounted on the shaft ahead of the stabilizing member is a blade or spinner. Ahead of the blade a number of beads are mounted on the shaft, capable of axial shifting thereon. The rotating blade is provided with a helical cam which cooperates with the stabilizing member to cause the blade and beads to shift forwardly on the shaft during rotation, followed by a sharp rearward movement thereof, emitting a sonic pulse. These pulses are repeated as the lure is drawn through the water.

Finally, U.S. Pat. No. 4,510,710 teaches a buzz bait-type lure having a single lower arm supporting a hook, a head, and a skirt surrounding the hook. The lure additionally has two substantially parallel upper arms, each supporting a spinner. The spinners are spaced from each other by a distance such that, as they rotate, their blade portions strike each other. Buzz bait lures have been devised with a single spinner so positioned that its blades contact the frame of the lure creating a fish attracting sound.

The present invention is based upon the discovery that a pair of similar blades can be rotatively mounted on the same shaft-like element of a lure (such as the upper wire-like arm of a buzz bait-type lure), and can be configured to rotate in the same direction at different speeds, with the result that the blades will strike each other producing a fish-attracting noise. This can be accomplished without interference in the overall rotation of the spinners and without having to maintain two spinner-carrying shafts carefully spaced from each other or a single spinner shaft carefully spaced from some other part of the lure frame. The blade assembly of the present invention produces a clicking or chattering sound which attracts fish. The nested positioning of the blades tends to shed grass or weeds, and the lure will run through tree tops virtually snagless. The blades of each spinner bear certain angular relationships to their respective spinner body, which enable the spinners to work throughout the retrieval length of a long cast or a short cast. Certain of the angular relationships can be adjusted to regulate the noise produced by the spinners so that the clicking or chattering noise is made up of a plurality of vibrant "pings" rather than dead sounding "clunks". A buzz bait-type lure can be made in accordance with the teachings of the present invention easily and inexpensively and adjustments can be readily made to improve its performance.

DISCLOSURE OF THE INVENTION

According to the invention there is provided a surface typing fishing lure having a pair of similar spinners mounted on the same shaft in nested fashion. The spinners rotate in the same direction at changing speeds so that their blades strike each other producing a fish attracting noise.

In an exemplary embodiment, the lure comprises a frame-like structure of stiff, bendable wire formed into an integral structure providing first and second arms. The first arm can be substantially rectilinear. A fish hook is rigidly affixed to the rearward end of the first arm and constitutes an extension thereof. The fish hook terminates in an upstanding barbed free end. A head element is affixed to or cast about the juncture of the first arm and the fish hook. A hook-concealing skirt made up of thin flexible strips may be affixed to the head element to trail therebehind as the lure is drawn through the water.

The forward end of the first arm terminates in a loop to which a fishing line can be secured. The loop, in turn, terminates in the above noted second frame arm. The second frame arm has first and second portions. The first portion of the second arm extends from the loop in a direction laterally of the first arm. The first portion of the second arm terminates in the second portion which extends generally in the same direction as the first arm. A pair of spinners is rotatively mounted in nested condition on the second portion of the second arm. The spinners are similarly configured, each having a body portion with two blades extending therefrom. The configuration of the blades and their angular relationships to their respective body portions cause them to rotate in the same direction at different speeds, striking each other to produce a fish-attracting sound.

The first and second arms of the lure can be substantially coplanar. The first and second arms can also be parallel, but preferably diverge slightly toward the rearward end of the lure. The angle of this divergence determines how fast the bait will rise to the surface of the water should it be allowed to sink. This divergence of the arms also allows the hook to ride somewhat deeper in the water for greater effectiveness.

BRIEF DESCRIPTION OF THE DRAWINGS

FIG. 3 is a bottom view of one of the spinners.

FIG. 4 is a front elevational view of the spinner of FIG. 3.

FIG. 5 is a fragmentary cross sectional view taken along section line 5, 6—5, 6 of FIG. 2, illustrating one rotational position of the spinners.

FIG. 6 is a fragmentary cross sectional view taken along section line 5, 6—5, 6 of FIG. 2, illustrating another rotational position of the spinners.

DETAILED DESCRIPTION OF THE INVENTION

Figure 1:
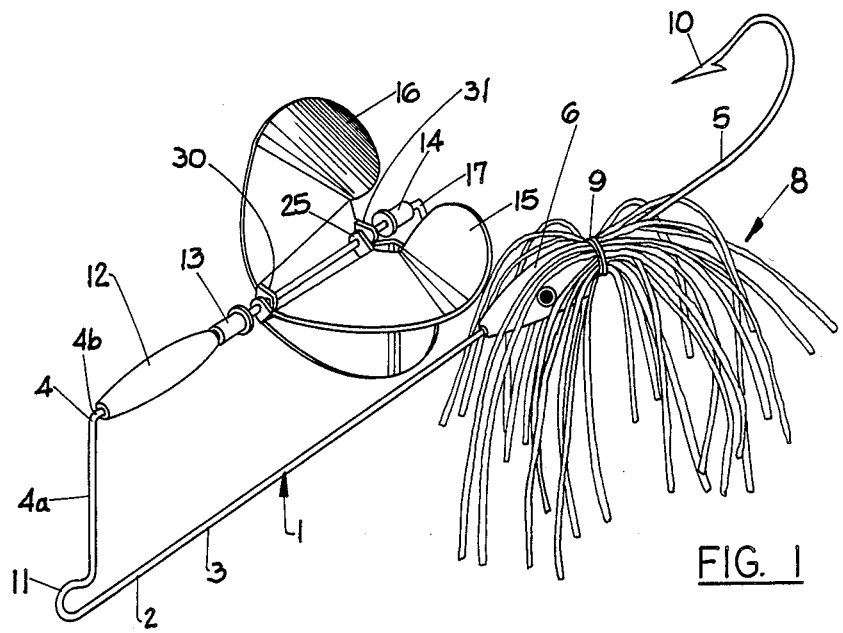
FIG. 1 is a perspective view of an exemplary lure of the present invention.
Figure 2:
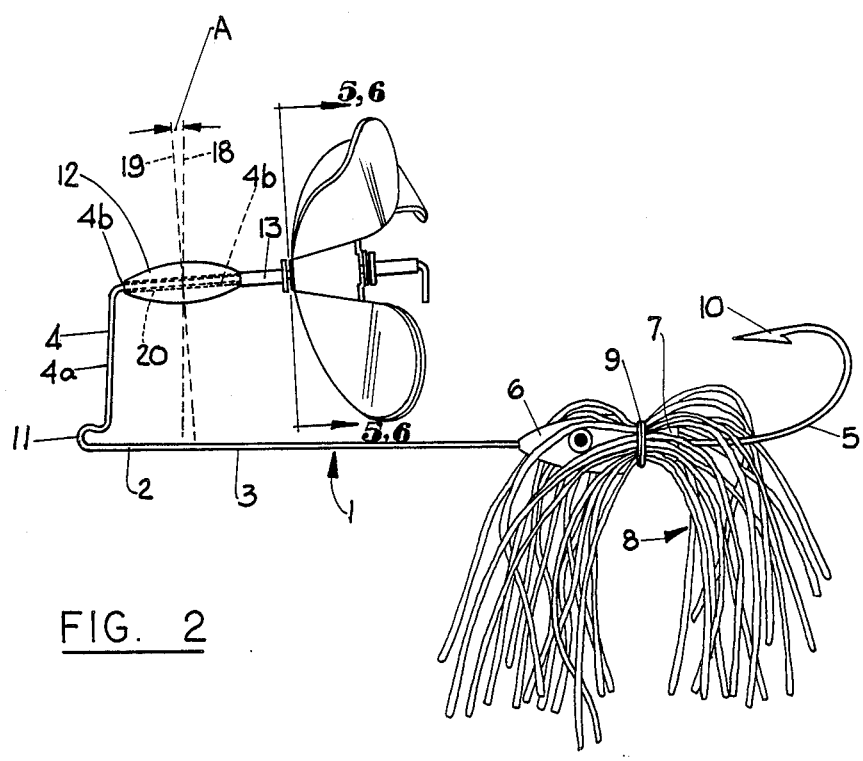
FIG. 2 is a side elevational view of the lure of FIG. 1.

As indicated above, the teachings of the present invention, for purposes of an exemplary showing, will be set forth in their application to a buzz bait-type lure, such as is illustrated in FIGS. 1 and 2. Reference is made to these figures, wherein like parts are given like index numerals.

The lure, generally indicated at 1, comprises a body or frame 2 made of stiff, resilient, bendable wire. The frame 2 is configured to provide a first arm 3 and a second arm 4. As is clear from FIGS. 1 and 2, the first arm 3 is substantially rectilinear.

A fish hook 5 is rigidly attached to the rearward end of the first arm 3. This may be accomplished in any appropriate manner. For example, the hook 5 may be provided with a conventional eyelet and the rearward end of the first arm 3 may be formed into a hook engaging the eyelet and the hook and arm may thereafter be rigidly interconnected by soldering of the like.

It is usual practice to provide the lure 1 with a head element 6. Generally, the head element is made of lead. The head element may be affixed to the first arm 3 and the fish hook 5, at the juncture thereof, by any appropriate means. Commonly, the head element 6 is simply cast about the juncture of the first arm 3 and the fish hook 5 which not only appropriately locates the head element 6 on the lure, but also can serve to rigidly join the fish hook 5 to the rearward end of the first arm 3.

Head element 6 serves additional functions with respect to lure 1. First of all, it acts as a weight or sinker to appropriately weight the lure. Furthermore, the head element 6 is generally provided with a shank portion 7 to which a skirt means may be affixed to make lure 1 more attractive to the fish and to conceal the hook 5 since the skirt means trails about the hook as the lure is drawn through the water. In the embodiment shown, the skirt means is generally indicated at 8 and comprises a plurality of thin, flexible plastic or rubber strips bound about the head element shank 7 as at 9. It will be noted that hook 5 is rigidly maintained in an upright position and terminates at its free end in the usual fish hook barb 10.

The first arm 3 terminates at its forward end in a loop-like structure 11. The loop-like structure 11 is adapted to serve as a means to which a fishing line (not shown) can be attached. The loop-like structure 11, in turn, terminates in second arm 4. Second arm 4 has two portions 4a and 4b. Portion 4a extends from the loop element 11 in a lateral direction with respect to the first arm 3. As viewed in FIGS. 1 and 2, and as the lure is oriented as it travels through the water, portion 4a extends essentially upwardly. The uppermost end of arm portion 4a terminates in arm portion 4b which extends generally rearwardly with respect to the lure. While not required, it is preferable that the first arm 3 and second arm 4, inclusive of both of its portion 4a and 4b, are substantially coplanar.

Arm portion 4b is shorter than first arm 3 and supports a spacer bead 12, a pair of bearing elements 13 and 14, and a pair of spinners 15 and 16, as will be described in detail hereinafter. The rearwardmost end 17 of arm portion 4b is bent downwardly, as shown in FIGS. 1 and 2 so that the spacer bead 12, bearing elements 13 and 14, and spinners 15 and 16 are captively mounted on arm portion 4b between the juncture of arm portions 4a and 4b and the downturned end 17.

Arm portion 4b can be substantially parallel to the first arm 3. Preferably, however, arm portion 4b and first arm 3 diverge rearwardly as is most clearly shown in FIG. 2. One way of measuring the amount of this divergence is by the angle A formed between an imaginary line 18 drawn perpendicular to the axis of second arm portion 4b and an imaginary line 19 drawn perpendicular to the axis of first arm 3 and passing through the intersection of imaginary line 18 and the axis of second arm portion 4b. The angle A can conveniently range from 0° to about 25°.

The fact that angle A is preferably greater than 0° (i.e., the fact that first arm 3 and second arm portion 4b preferably diverge in a rearward direction), is based upon the fact that angle A determines how fast the bait will get to the surface during retrieval, should it have been allowed to sink after casting. Furthermore, this permits hook 5 to ride deeper in the water which improves chances of hooking a fish attempting to swallow the lure. Similarly, while the first arm 3 has been shown and described as being substantially rectilinear, the first arm 3 could be bowed slightly downwardly (as viewed in FIG. 2), or the axis of the shank of hook 5 could lie at a slight downward angle with respect to the remainder of first arm 3, again to cause the hook 5 to ride deeper in the water during lure retrieval.

The elongated spacer bead 12 can be made of any appropriate material inclusive of plastic. Spacer bead 12 has an axial bore 20 through which the second arm portion 4b extends. The bead is preferably shiftable axially of arm portion 4b. It will be understood by one skilled in the art that the elongated bead 12 could be replaced by a series of smaller spherical beads or the like. In fact, any appropriate spacer means could be used in lieu of elongated bead 12.

Each of the bearing means 13 and 14 may constitute simple grommets having cylindrical body portions terminating at one end in a radial flange. The bearing means 13 and 14 have suitable axial perforations by which they are mounted on arm portion 4b. The bearing elements 4a and 4b are preferably oriented with their respective flange portions facing spinners 15 and 16, so as to provide bearing surfaces therefor.

Spinners 15 and 16 will next be described. Since spinners 15 and 16 are essentially identical, a description of spinner 15 can serve as a description for spinner 16, as well. To this end, reference is made to FIGS. 3 and 4, wherein spinner 15 is illustrated.

The spinner 15 is preferably made of aluminum (so as to be rust-free) and comprises a substantially planar central body portion 21 and laterally extending blade portions 22 and 23. The central body portion 21 has a downwardly depending tab 24 at its forward end and a downwardly depending tab 25 at its rearward end. As can most clearly be seen in FIG. 4, the downwardly depending tab 24 has a perforation 26 formed therein. The tab 25 will have a similar perforation (not shown) formed therein. The perforations of the tabs 24 and 25 are coaxial and the arm portion 4b of frame 2 passes therethrough, in this way rotatively mounting spinner 15 on arm portion 4b.

Again as can most clearly be seen in FIG. 4, blade portions 22 and 23 are bent upwardly from the plane of central body portion 21 along bend lines 27 and 28 (see FIG. 3). Thus, the substantially planar central body portion 21 is defined by its forward end and its rearward end, together with bend lines 27 and 28, and has the general configuration of a right trapezoid.

It has been determined that the angle B defined between bend lines 27 and 28 (see FIG. 3) is significant because it assures that the spinners will spin throughout the operation of reeling the bait in, whether the original cast was long or short. For best operation of the lure, the angle B should fall within the range of from about 15° to about 22°.

It has also been found that the angles C and D between the upwardly bent blades 22 and 23 and the plane of the central body portion 21 are also of importance. The angles C and D determine the amount and nature of the sound made by the nested spinners 15 and 16. When angles C and D fall within the proper range, the blades will make the maximum amount of sound, and the nature of the sound will be a vibrant "ping", rather than a dead "clunk". To this end, angles C and D should fall within the range of from about 15° to about 45°. So long as they fall within this range, angles C and D need not necessarily be identical.

As indicated above, spinner 16 is substantially identical to spinner 15, having a central body portion 27 and blade portions 28 and 29, together with downwardly depending tabs 30 and 31 (see FIGS. 1, 5 and 6).

As will be noted from FIG. 1, when spinners 15 and 16 are mounted in nested position on arm portion 4b, the tabs 24 and 25 of spinner 15 are located just forward of tabs 30 and 31, respectively, of spinner 16. As a result of this, in conjunction with angles C and D, it will be noted that when blade 23 of spinner 15 coacts with blade 28 of spinner 16, they nearly nest, as shown in FIG. 5. On the other hand, when blade 29 of spinner 16 coacts with blade 22 of spinner 15, they do not nest to the same extent, as shown in FIG. 6. In FIGS. 5 and 6, the direction of rotation is illustrated by arrow E.

All of these factors, i.e., angles C and D, the relative positions of spinners 15 and 16 on arm portion 4b, and the manner of which coacting blades nest, coact to cause the spinners to rotate at different speeds at different times to assure proper action and sound production by coacting spinner blades. The action and sound production of the nested spinners of the present invention does not impede spinner rotation and does not require careful tolerances between separately mounted spinners or a spinner and another part of the lure frame. As indicated above, the nested design of the spinners tends to shed grass or weeds and render the lure substantially snagless.

To complete the lure, head element 6, skirt 8 and spacer bead 12 may be provided in a variety of colors, as is known in the art. The head element may have eyes painted or otherwise affixed thereto. A wide variety of head shapes, including round, banana, torpedo, and flat, as is known in the art, can be provided. Furthermore, the lure may have weed guards installed, again as is known in the art.

Modifications may be made in the invention without departng from the spirit of it.

What we claim is:

1. A surface type fishing lure comprising an elongated body, said body having a forward end configured for attachment to a fishing line and a rearward end, a fish hook affixed to said body rearward end, said body having a shaft-like portion, a pair of spinners rotatively mounted on said shaft-like portion in nested condition, each of said spinners comprising a central body portion and a pair of blades extending therefrom, said body portion of each spinner having a forward edge and a rearward edge, a forward tab and a rearward tab extending downwardly from each of said forward and rearward body portion edges respectively, said forward and rearward tabs having coaxial holes therein receiving said shaft-like portion of said lure body therethrough, said nested blades on said shaft-like portion of said lure body having their forward tabs adjacent each other and their rearward tabs adjacent each other, said blades of said spinners being so configured and so angularly related to their respective body portions that said spinners rotate in the same direction at different speeds at different times, whereby they strike each other producing a fish attracting sound.

2. A surface type fishing lure comprising an elongated body, said body having a forward end configured for attachment to a fishing line and a rearward end, a fish hook affixed to said body rearward end, said body having a shaft-like portion, a pair of spinners rotatively mounted on said shaft-like portion in nested condition, each of said spinners comprising a central body portion and a pair of blades extending therefrom, said body portion and said blades of each spinner comprise a one-piece integral structure, said body portion being substantially planar, said bodyportion having a forward edge and a rearward edge, a forward tab and a rearward tab extending downwardly from each of said forward and rearward body portion edges respectively, said forward and rearward tabs having coaxial holes therein receiving said shaft-like portion of said lure body therethrough, said blades each extending upwardly and outwardly from said body portion along a fold line therebetween, said blades forming acute exterior angles C and D with the plane of said body portion, said fold lines defining the sides of said body portion, said sides and front and rear edges defining a right trapezoid, said fold lines diverging from said forward edge toward said rearward edge at an acute angle B therebetween, said nested blades on said shaft-like portion of said lure body having their forward tabs adjacent each other and their rearward tabs adjacent each other, said blades of said spinners being so configured and so angularly related to their respective body portions that said spinners rotate in the same direction at different speeds at different times, whereby they strike each other producing a fish attracting sound.

3. The fishing lure claimed in claim 2 wherein said lure body comprises a one-piece, integral, stiff, bendable wire member, said wire member comprising a first leg having a rearward end, a fish hook affixed to said first leg rearward end and constituting a continuation of said first leg, said first leg having a forward end terminating in a U-shaped loop for attachment of a fishing lure, said loop terminating in a second leg of said wire member, said second leg having a first portion extending laterally with respect to said first leg and a second portion extending in substantially the same direction as said first leg, said second portion of said second leg comprising said shaft-like portion of said lure body on which said spinners are rotatably mounted in nested condition.

4. The fishing lure claimed in claim 2, wherein said exterior acute angles C and D each lie within the range of from about 15° to about 45°.

5. The fishing lure claimed in claim 2, wherein said acute angle B lies within the range of about 15° to about 22°.

6. The fishing lure claimed in claim 3 including a head mounted on said lure body at the juncture of said first leg rearward end and said fish hook, said head having a rearwardly extending shank, a plurality of thin flexible strips attached to said shank and comprising a skirt to conceal said hook.

7. The fishing lure claimed in claim 3 wherein said first and second legs of said wire member are substantially coplanar.

8. The fishing lure claimed in claim 3 wherein said second portion of said second leg terminates in a free rearward end bent at an angle of about 90° to said second portion, a rearward bearing means on said second portion of said second leg between said bent end thereof and said nested spinners, a forward bearing means on said second portion of said second leg in front of an adjacent said spinners, and at least one spacer on said second portion of said second leg extending from said forward bearing to said juncture of said first and second portions of said second leg.

9. The fishing lure claimed in claim 3, wherein said exterior acute angles C and D each lie within the range of from about 15° to about 45°.

10. The fishing lure claimed in claim 3, wherein said acute angle B lies within the range of about 15° to about 22°.

11. The fishing lure claimed in claim 7 wherein said first leg and said second portion of said second leg diverge slightly toward said rearward end of said lure body.

12. The fishing lure claimed in claim 10, wherein said exterior acute angles C and D each lie within the range of from about 15° to about 45°.

13. The fishing lure claimed in claim 12 including a head mounted on said lure body at the juncture of said first leg rearward end and said fish hook, said head having a rearwardly extending shank, a plurality of thin flexible strips attached to said shank and comprising a skirt to conceal said hook.

14. The fishing lure claimed in claim 13 wherein said second portion of said second leg terminates in a free rearward end bent at an angle of about 90° to said second portion, a rearward bearing means on said second portion of said second leg between said bent end thereof and said nested spinners, a forward bearing means on said second portion of said second leg in front of an adjacent said spinners, and at least one spacer on said second portion of said second leg extending from said forward bearing to said juncture of said first and second portions of said second leg.

15. The fishing lure claimed in claim 14 wherein said first and second legs of said wire member are substantially coplanar.

* * * * *